June 11, 1963 R. C. WILSON 3,093,032

FLOATING TRACKS

Original Filed Oct. 22, 1959 14 Sheets-Sheet 1

INVENTOR

Richard C. Wilson

BY O. Baxter Warner

Walter G. Finch

ATTORNEYS

June 11, 1963 R. C. WILSON 3,093,032

FLOATING TRACKS

Original Filed Oct. 22, 1959 14 Sheets-Sheet 3

June 11, 1963 R. C. WILSON 3,093,032

FLOATING TRACKS

Original Filed Oct. 22, 1959 14 Sheets-Sheet 4

June 11, 1963 R. C. WILSON 3,093,032

FLOATING TRACKS

Original Filed Oct. 22, 1959 14 Sheets-Sheet 5

June 11, 1963 R. C. WILSON 3,093,032

FLOATING TRACKS

Original Filed Oct. 22, 1959 14 Sheets-Sheet 7

FLOATING TRACKS

Original Filed Oct. 22, 1959

June 11, 1963 R. C. WILSON 3,093,032

FLOATING TRACKS

Original Filed Oct. 22, 1959 14 Sheets-Sheet 11

June 11, 1963 R. C. WILSON 3,093,032

FLOATING TRACKS

Original Filed Oct. 22, 1959 14 Sheets-Sheet 12

June 11, 1963 R. C. WILSON 3,093,032

FLOATING TRACKS

Original Filed Oct. 22, 1959 14 Sheets-Sheet 14

United States Patent Office 3,093,032
Patented June 11, 1963

3,093,032
FLOATING TRACKS

Richard C. Wilson, Champlin, Minn., assignor, by mesne assignments, to the United States of America as represented by the Secretary of the Navy Original application Oct. 22, 1959, Ser. No. 848,163. Divided and this application Jan. 20, 1960, Ser. No. 3,700
4 Claims. (Cl. 89—1.7)

The present invention relates generally to conveyor apparatus, and more particularly it pertains to devices hereinafter referred to as floating tracks for bringing supporting skid shoes of a booster of a missile weapon, with or without aerodynamic surfaces, into alignment with a conveyor skid track, hereinafter referred to as a loader skid track.

This patent application is a division of U.S. patent application, Serial Number 848,163, entitled "Guided Missile Launching System," invented by Myron J. Bauer et al., filed October 22, 1959.

In modern ordnance armament for use in storing, transporting and launching guided missile weapons, such weapons are normally stored in a ready service mechanism. Each missile weapon consists of a missile having a certain type of warhead and a booster for launching the missile. Each missile and booster is clamped together by means of a clamping ring, which is discarded in aerial flight. While in storage in the ready service mechanism, the missile-booster combination is supported by lower forward and aft booster shoes. The missile can also be supported at its forward part in a tray.

When the desired missile-booster combination is selected for transfer from the ready service mechanism to the launcher of the guided missile launching system, the tray with the missile-booster combination therein is lifted by a pair of center hoists of the ready service mechanism for transfer to the loader. Upper forward and aft booster shoes on the booster of the missile-booster combination are used for effecting transfer of the latter to the launcher.

Variation in the position of these upper forward and aft booster shoes can be expected between successive load cycles in a plane at right angles to the loader or conveyor for transferring the missile-booster combination or weapon to the launcher. In the vertical plane, the missile-booster combination is raised in its tray to a nominal position below the rail of the loader. The engaging surfaces of the upper aft booster shoe will be approximately one quarter inch below this position. However, the vertical lift of the missile-booster combination will vary as much as plus or minus one quarter of an inch.

Inasmuch as each tray in a ready service mechanism is supported by the ends only, a certain amount of sag of the missile-booster combination can be expected. As a result, the upper forward booster shoe lift will be approximately one half an inch below the normal load position with a vertical tolerance of plus or minus one half an inch.

In the lateral or transfer direction, the upper forward and aft booster shoes can be misaligned as much as plus or minus three quarters of an inch. The upper forward booster shoe, with its wide wheel base, can be tilted as much as plus or minus two degrees relative to the loader rail in the lateral plane. Any deviation, however, cannot be corrected by wedging the missile-booster combination into alignment with tapered receptacles.

Because of the accumulation of these mechanical tolerances between the relative positions of a hoisted missile-booster combination and the loader to which it is to be loaded, it is necessary to provide intermediate converging mechanism to effect the transfer of the missile-booster combination to a loader of a guided missile launching system for further movement to a launcher for launching of the missile weapon at an aerial target.

It is an object of this invention, therefore, to provide an intermediate converging mechanism or floating tracks for a loader of a guided missile launching system which will assure a positive alignment of a missile-booster combination with the loader under adverse conditions and during the transfer of the missile-booster combination thereto.

Still another object of this invention is to provide a pair of spaced forward and aft floating tracks for use in conjunction with a saddle cart for effectively and efficiently effecting transfer of a missile-booster combination from a ready service mechanism to a loader for further movement to a launcher for launching of the missile weapon.

In accordance with the invention, forward and aft floating tracks are provided for effectively and efficiently effecting transfer of a missile-booster combination from the tray of a ready service mechanism to a loader for further movement to a launcher. In a stowed and load position, the aft floating track is mated with a saddle cart which floats with it while engaging the upper aft booster shoe of the booster of the missile-booster combination.

The aft and forward floating tracks differ only slightly, the difference being mainly in the manner in which each aligns to the upper aft and forward shoes of the booster.

The aft floating track, synchronized with the movement of the forward floating track, extends down with a slotted receptacle of the saddle cart to engage the aft booster shoe. The forward floating track, on the other hand, directly engages the forward booster shoe. A rammer is then operated to force the aft shoe of the booster into seated position in the saddle cart receptacle and the forward booster shoe into the skid tracks of the forward floating track.

The missile-booster combination is then raised from a tray of the ready service mechanism and transferred to the loader. The skid tracks are identical in shape for the forward and aft floating tracks and the trunk sections of the trunk of the loader.

The forward and aft floating tracks extend before a pair of center hoists of the ready service mechanism is raised. Prior to this, the ready service tray has indexed to position the desired missile-booster combination, namely a standard missile-booster combination or an atomic missile-booster combination in the pair of center hoists.

The assembly of each floating track consists of a latch valve block attached to a latch frame which has two switches mounted thereon. One switch is used in conjunction with a servo lift piston in a lowered position and the other switch is used for a servo lift piston in a raised position. These switches are connected to a servo piston housing containing a servo lift piston and a servo valve. The entire unit is supported by a cam frame which, in turn, is bolted to a trunk section of the loader.

A hanger frame, which reaches around the cam frame, supports two short lengths of skid tracks. In the forward floating tracks, these sections of skid tracks are provided with a tapered lead-in slot to receive the forward booster shoe when a missile-booster combination is raised by the pair of center hoists of the ready service mechanism.

The floating hanger frame is independent of the chain tracks. The sections of the skid tracks straddle the chain tracks. The chain tracks support the hanger frame until the missile-booster combination is raised from the tray of the ready service mechanism to make contact and lift the hanger frame. The hanger frame is raised and lowered by the servo lift piston. This piston is linked to the hanger frame by a set of toggle links and hanger bars.

In the floating or load position, the hanger bars and a pair of hanger blocks support the weight on hanger cams.

The hanger blocks are retained in this position by the toggle links which are lifted slighty beyond center by a servo lift piston pin connected to the servo lift piston. When the loader assembly power is off, the servo lift piston is locked in this position by a latch in the latch frame.

The hanger frame is held in a centered position by a pair of spring-loaded centering plungers which contact the inner side of the chain tracks. In addition to the gravity load of the hanger frame, there is a hydraulic force of 600 pounds acting on the frame. This weight must be overcome when the forward and aft booster shoes make contact and lift the frame.

The forward and aft floating tracks align independently of each other with their respective booster shoe. For example, one floating track may align from the right of the centerline, while the other floating track may align from the left.

Other objects and advantages of this invention will become more readily apparent and understood from the following detailed specification and accompanying drawings in which.

Figure 1:
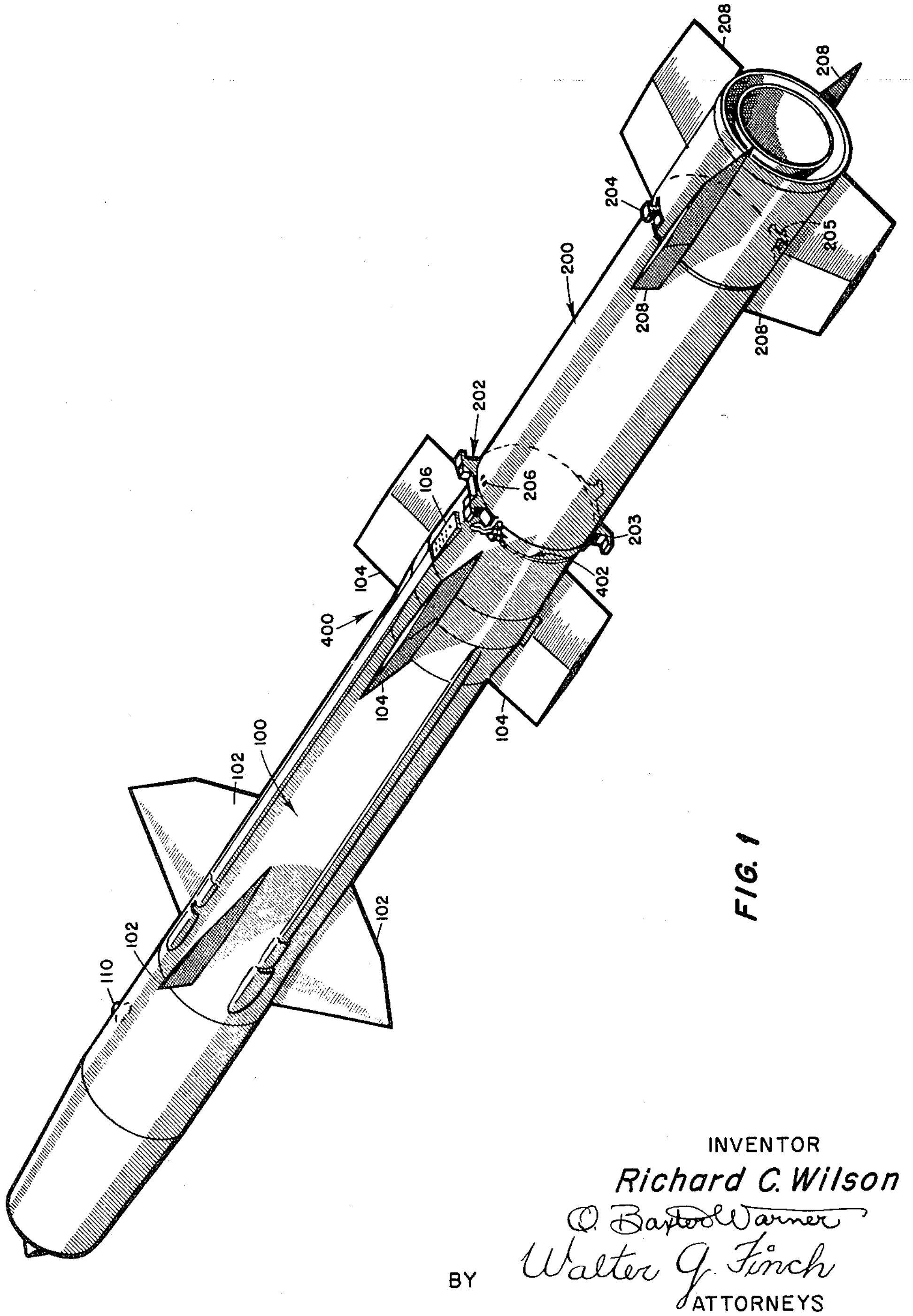
FIG. 1 is a perspective view of a missile weapon.
Figure 2:
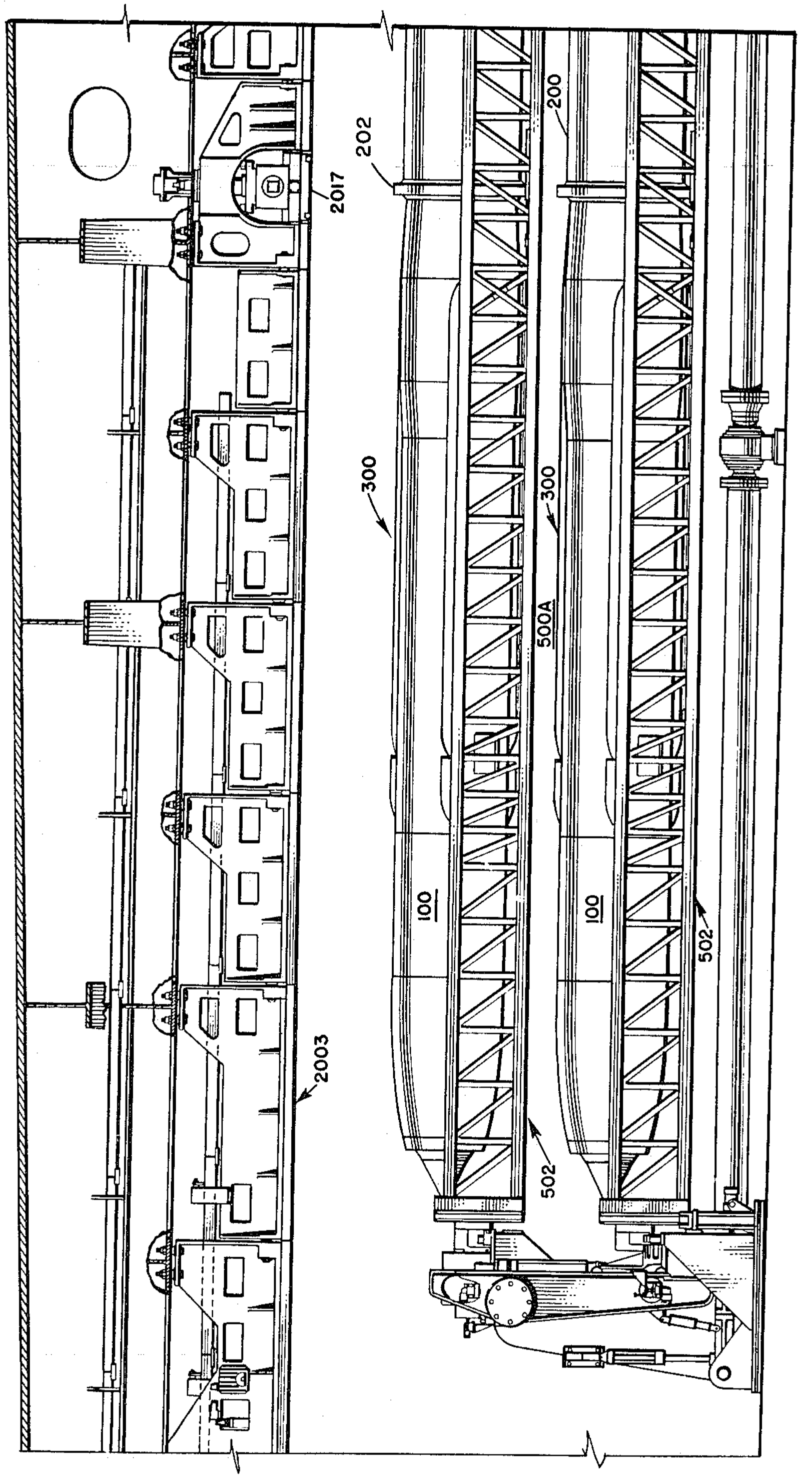
FIG. 2 is a side elevation, with parts removed, of a portion of a guided missile loader trunk, together with a missile storage, hoisting and forward floating track arrangement.

Referring now to FIG. 2 of the drawings, there is shown therein a conveyer type of loader trunk 2003 upon which is to be suspended and conveyed a missile-booster combination 300 consisting of a missile 100 without the wings 102 and fins 104, and a booster 200 without the fins 208 of FIG. 1. When the wings 102 and fins 104 and 208 are assembled to the missile-booster combination 300, it becomes a missile weapon 400.

Figure 2A:
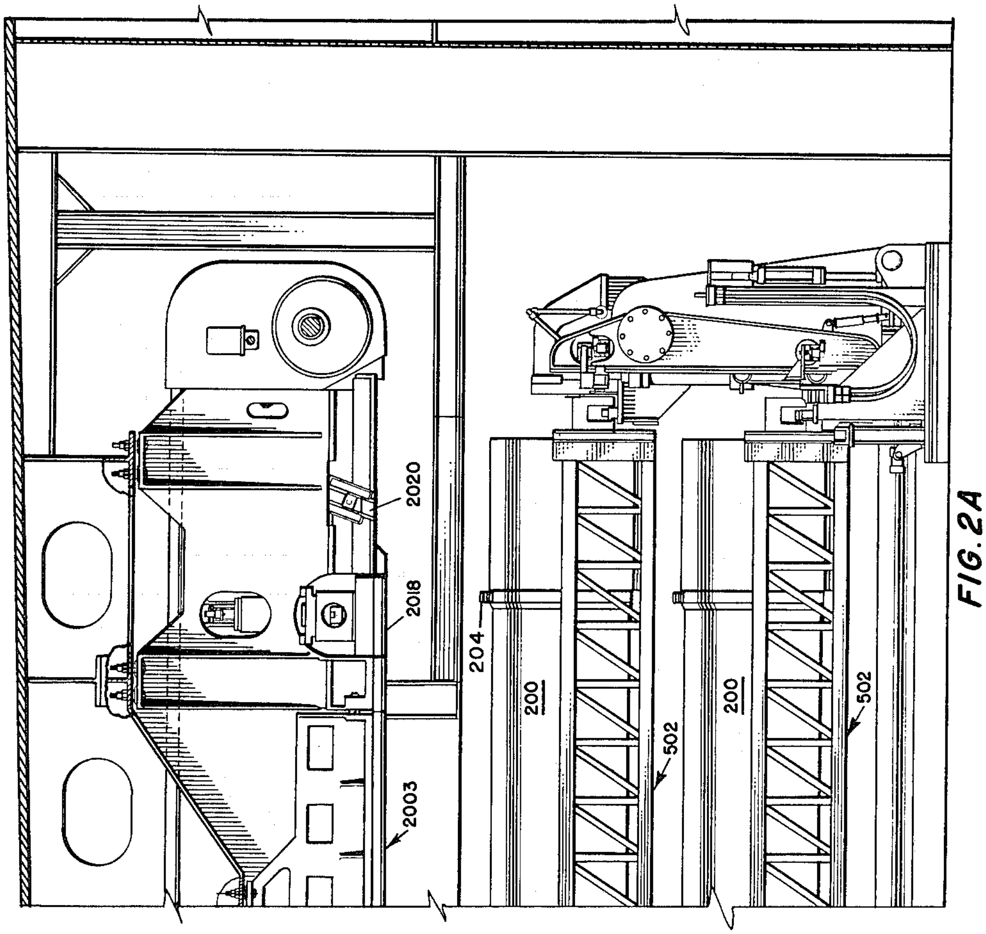
FIG. 2A is a continuation of the side elevation of FIG. 2, with parts removed, showing an aft floating track mechanism and a rammer therefor.
Figure 3:
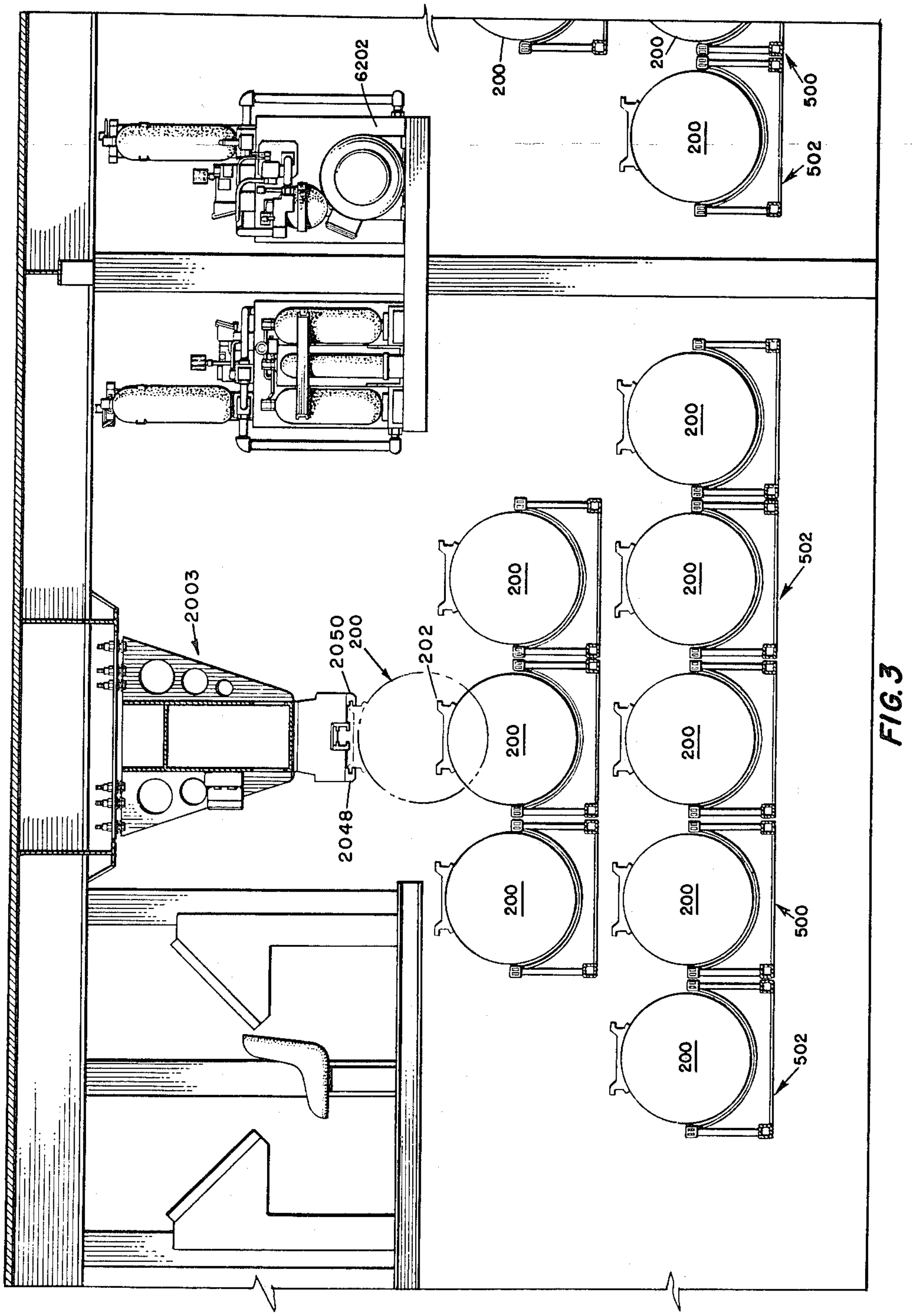
FIG. 3 is an end view, with parts removed, of the guided missile loader trunk of FIGS. 2 and 2A, including missile storage area.

The booster 200 is provided with a forward upper booster shoe 202, and an aft upper booster shoe 204, as shown in FIGS. 1, 2, and 2A, for the purposes of being suspended and conveyed as indicated. The upper aft shoe 204 is relatively narrow, but the upper forward shoe 202 is wide, and shaped for sliding engagement with a pair of skid tracks 2048 and 2050 on the trunk 2003 when the missile-booster 300 is loaded thereon, as shown in phantom in FIG. 3.

The booster 200 is also provided with lower forward and aft handling shoes 203 and 205, respectively. A clamping ring 402 is used to clamp the missile 100 and booster 200 together. The missile 100 is provided with a warhead arming mechanism 110, while the booster is provided with an arming mechanism 206, as best shown in FIG. 1.

A forward floating track 2017 is provided in the trunk 2003. It is positioned directly above the upper forward shoe 202 of the booster 200, and a similar aft floating track 2018 is positioned above the upper aft shoe 204 as shown in FIGS. 2 and 2A. When the missile-booster combination 300 is lifted in its storage tray 502 from the ready service mechanism 500 by external means to the proximity of the loader trunk 2003, the final portion of the lift will be effected by these floating tracks 2017 and 2018 as will be related. The forward and aft floating tracks 2017 and 2018 differ only slightly, the difference being mainly in the manner in which each aligns to the rear and forward shoes 204 and 202 of the booster 200. For this reason, the detailed description of the aft floating track 2018 also applies to the forward floating track 2017.

The aft floating track 2018, synchronized with the movement of the forward floating track 2017, extends down to engage the aft booster shoe 204. The forward floating track 2017, on the other hand, engages the forward booster shoe 202. A rammer 2020 is then operated and it forces the forward and aft shoes 202 and 204 of the booster 200 forward four (4) inches into the skid tracks 2048 and 2050 of the forward and aft floating tracks 2017 and 2018, respectively. The missile-booster combination 300 is then raised from the hoisting tray 502 by the floating tracks 2017 and 2018, transversely aligned and transferred to the loader trunk 2003. It is to be noted that the skid tracks 2048 and 2050 are identical in shape and size for the forward and aft floating tracks 2017 and 2018 and for the loader trunk 2003.

Figure 4:
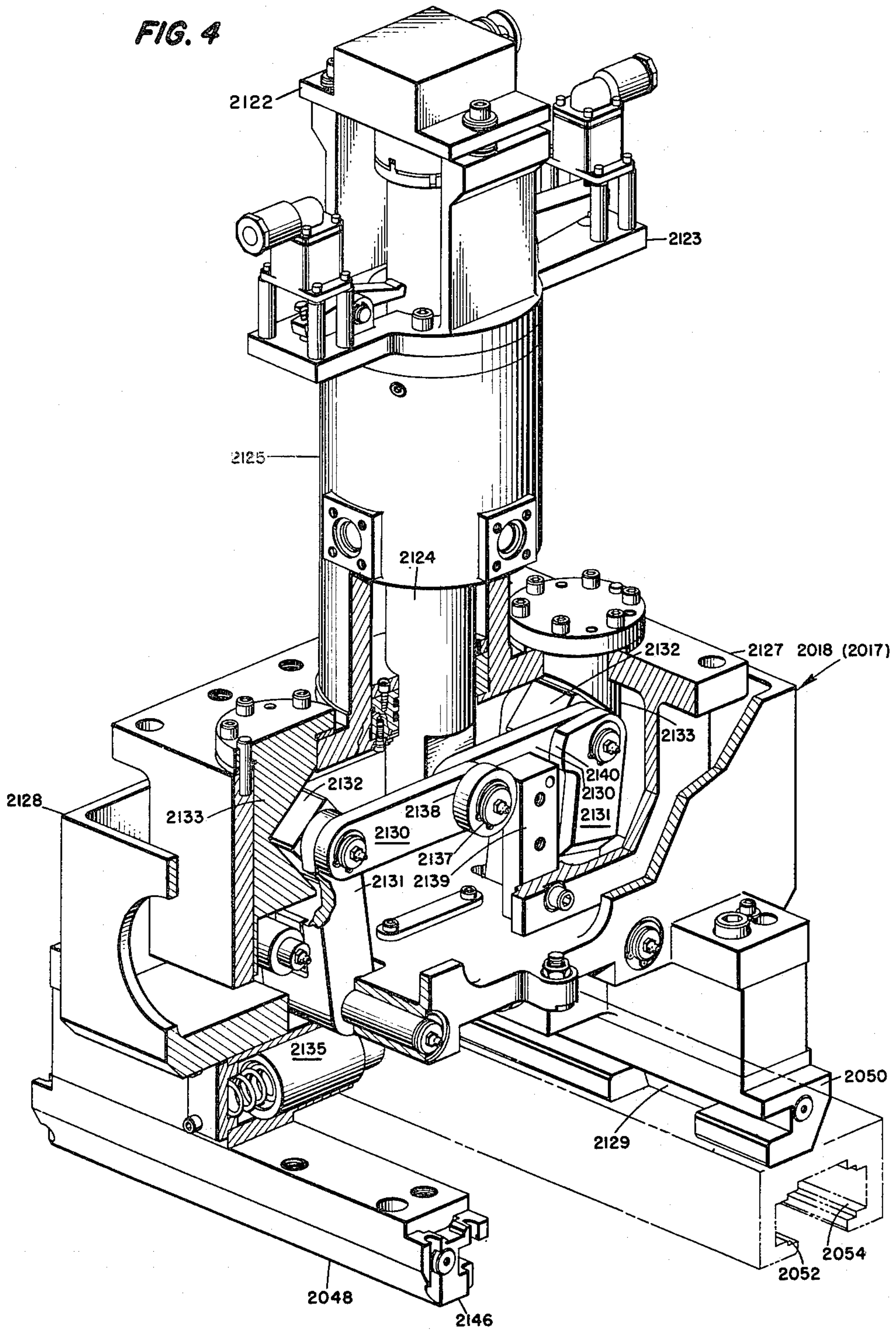
FIG. 4 is a dimetric view, partly broken away, of a floating track in a lowered position.
Figure 5:
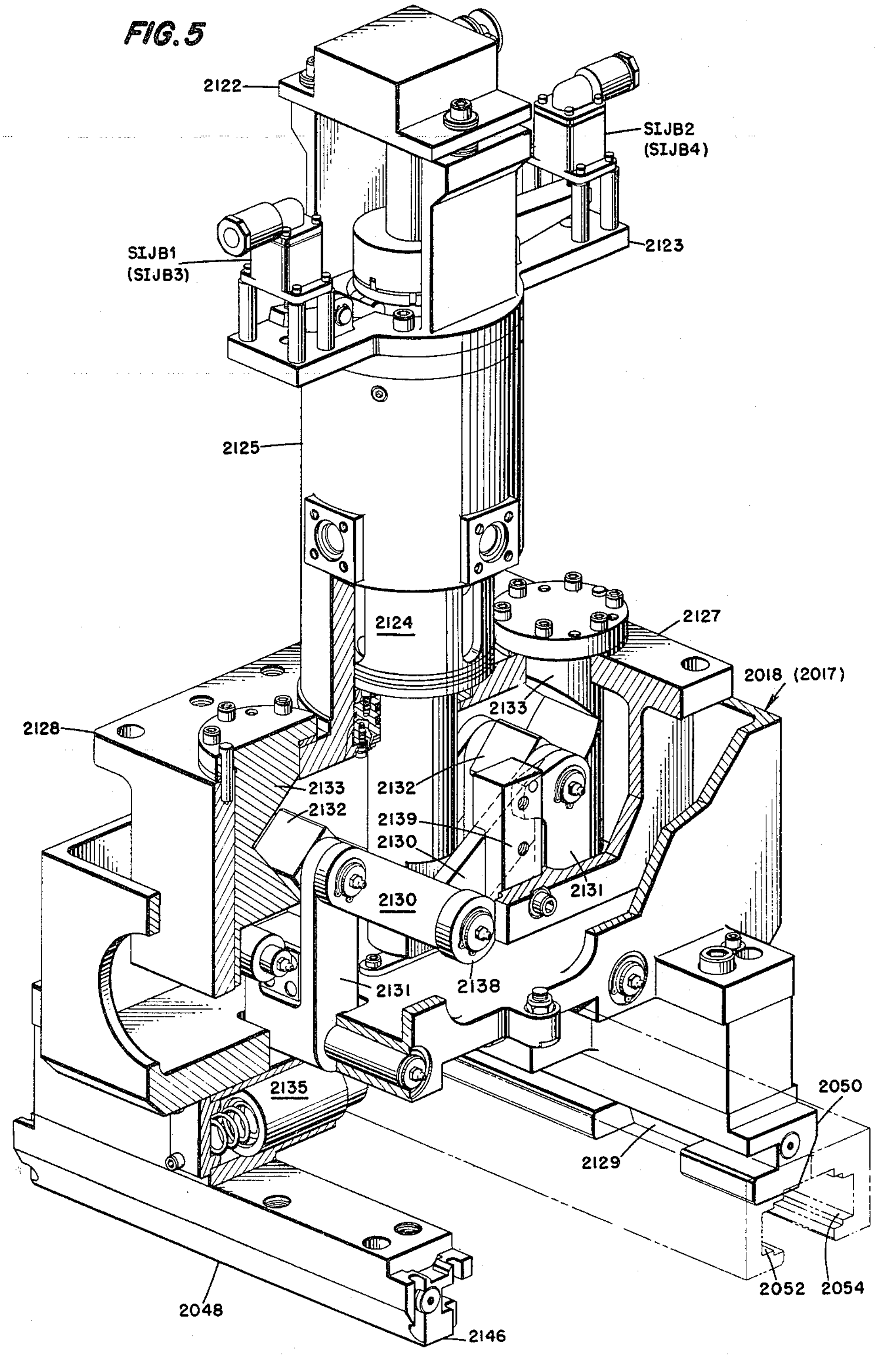
FIG. 5 is a dimetric view, partly broken away, of a floating track in a raised position.
Figure 6:
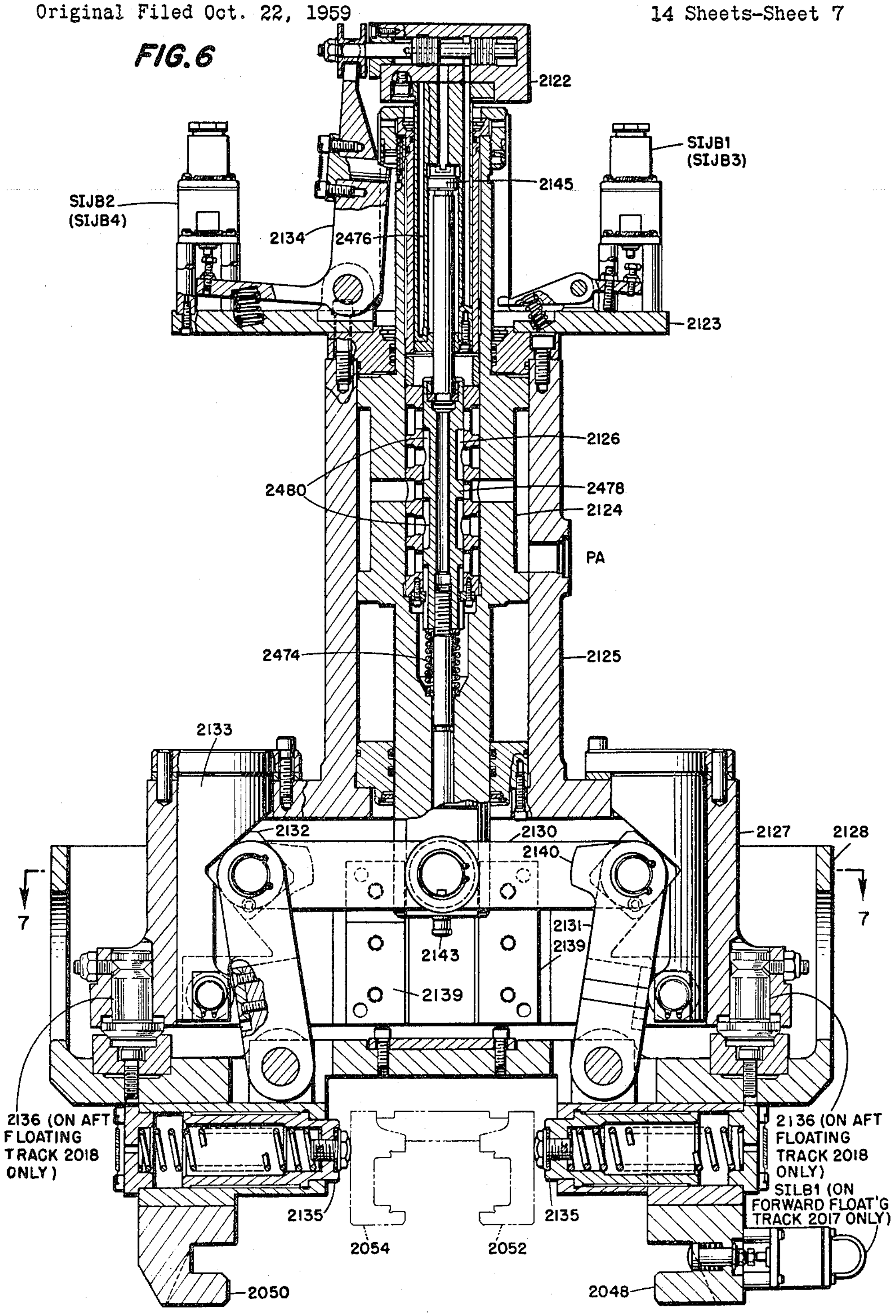
FIG. 6 is a vertical section, partly in elevation, of a floating track.
Figure 8:
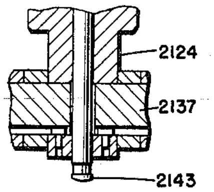
FIG. 8 is a cross section taken along line 8—8 of FIG. 7.
Figure 7:
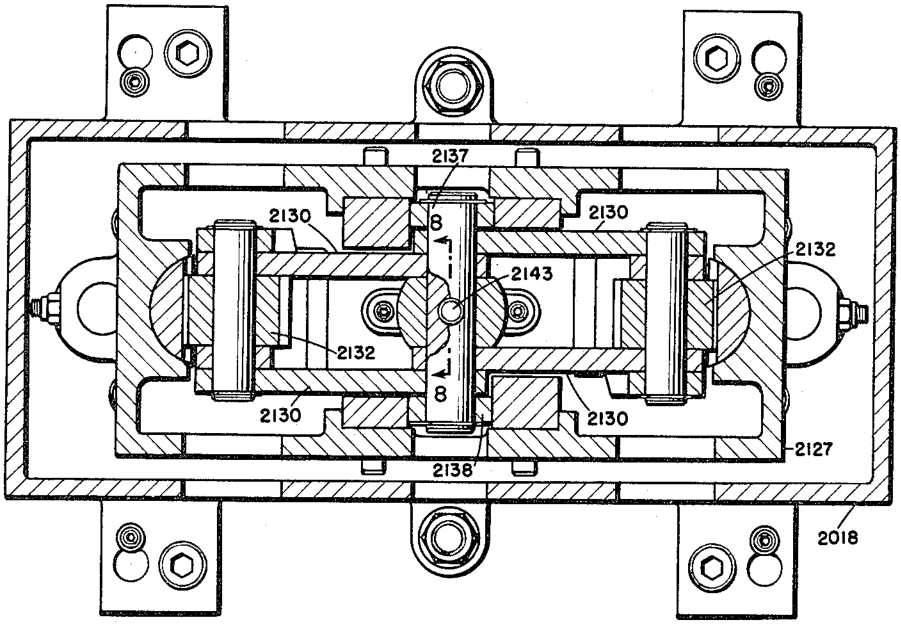
FIG. 7 is a cross section taken along line 7—7 of FIG. 6.

FIGS. 4 and 5 show dimetric views of the aft and forward floating tracks 2018 and 2017, and their various components are further illustrated in FIGS. 6, 7, and 8. The track 2017 or 2018, as shown in FIG. 4, is in a lowered position, while in FIG. 5, it is shown in a raised position.

Figures 11, 12:
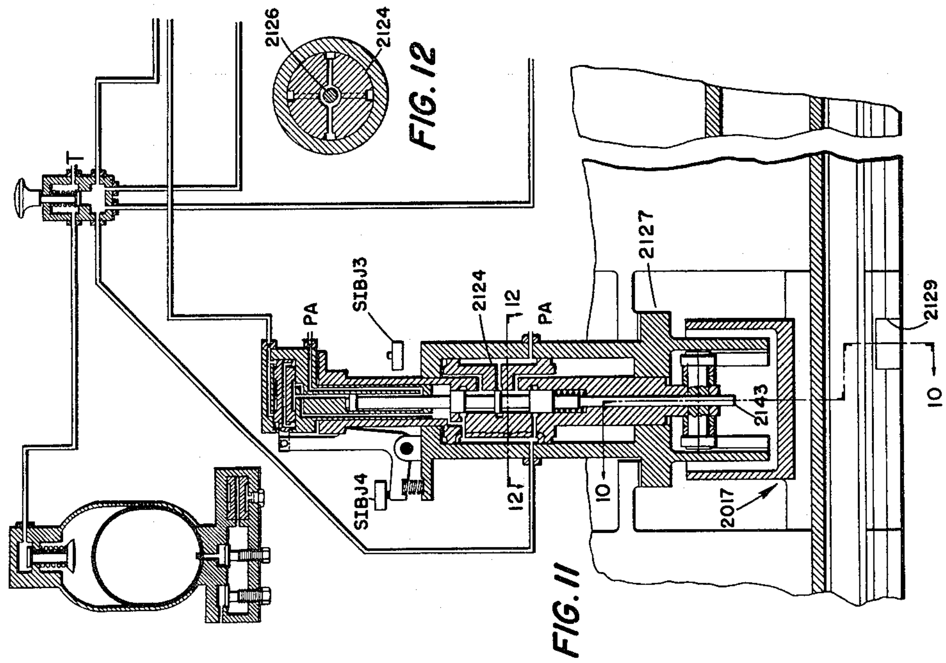
FIG. 11 is a vertical section of the hydraulic components of the forward floating track.
FIG. 12 is a cross section taken along line 12—12 of FIG. 11.

The assembly of each floating track 2017 or 2018 consists of a latch valve block 2122 attached to a latch frame 2123 which has two switches SIJB1 and SIJB2 mounted thereon. Switch SIJB1 is used in conjunction with a servo lift piston 2124 in a lowered position and the other switch SIJB2 for the servo lift piston 2124 in a raised position. These switches SIJB1 and SIJB2 are connected to a servo piston housing 2125 containing the servo lift piston 2124 and a servo valve 2126 within, as shown in FIGS. 11 and 12. The entire unit is supported by a cam frame 2127 which, in turn, is bolted to the loader trunk.

A hanger frame 2128, which reaches around the cam frame 2127, supports the two short lengths of skid tracks 2048 and 2050. In the forward floating track 2017, these sections of skid tracks 2048 and 2050 have tapered lead-in slots 2129, shown best in FIGS. 4 and 5, provided in each to receive the forward booster shoe 202 when a missile-booster combination 300 is raised in its tray 502 by ready service mechanism 500. The "narrow gauge" aft booster shoe 204 is received by the aft floating track 2018 indirectly through an intermediate saddle cart arrangement 2006, shown in FIG. 15, which compensates for the width discrepancy and also provides conveying power.

The floating hanger frame 2128 is independent of a trunk supported pair of drive chain tracks 2052 and 2054, shown in phantom in FIGS. 4, 5, and 6. Tracks 2048 and 2050 straddle the chain tracks 2052 and 2054. These chain tracks 2052 and 2054 support the hanger frame 2128 until the missile-booster combination 300 is raised from the tray 502 of the ready service mechanism 500 to make contact and lift the hanger frame 2128.

The hanger frame 2128 is raised and lowered by the servo lift piston 2124. This piston 2124 is linked to the hanger frame 2128 by a set of toggle links 2130 and hanger bars 2131.

Figure 9:
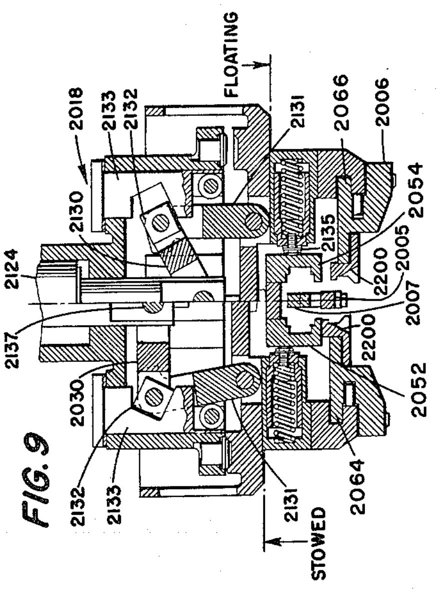
FIG. 9 is a vertical section of the lower portion of the aft floating track, chain tracks and saddle cart, with the right side shown floating and left side shown stowed.
Figure 10:
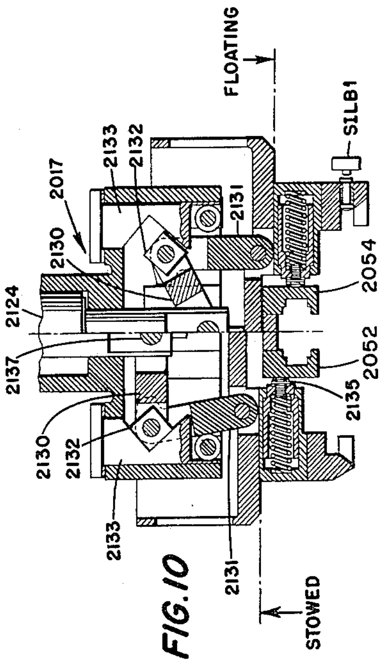
FIG. 10 is a vertical section of the lower portion of the forward floating track, and chain tracks with the right side shown floating and left side shown stowed.
Figure 13:
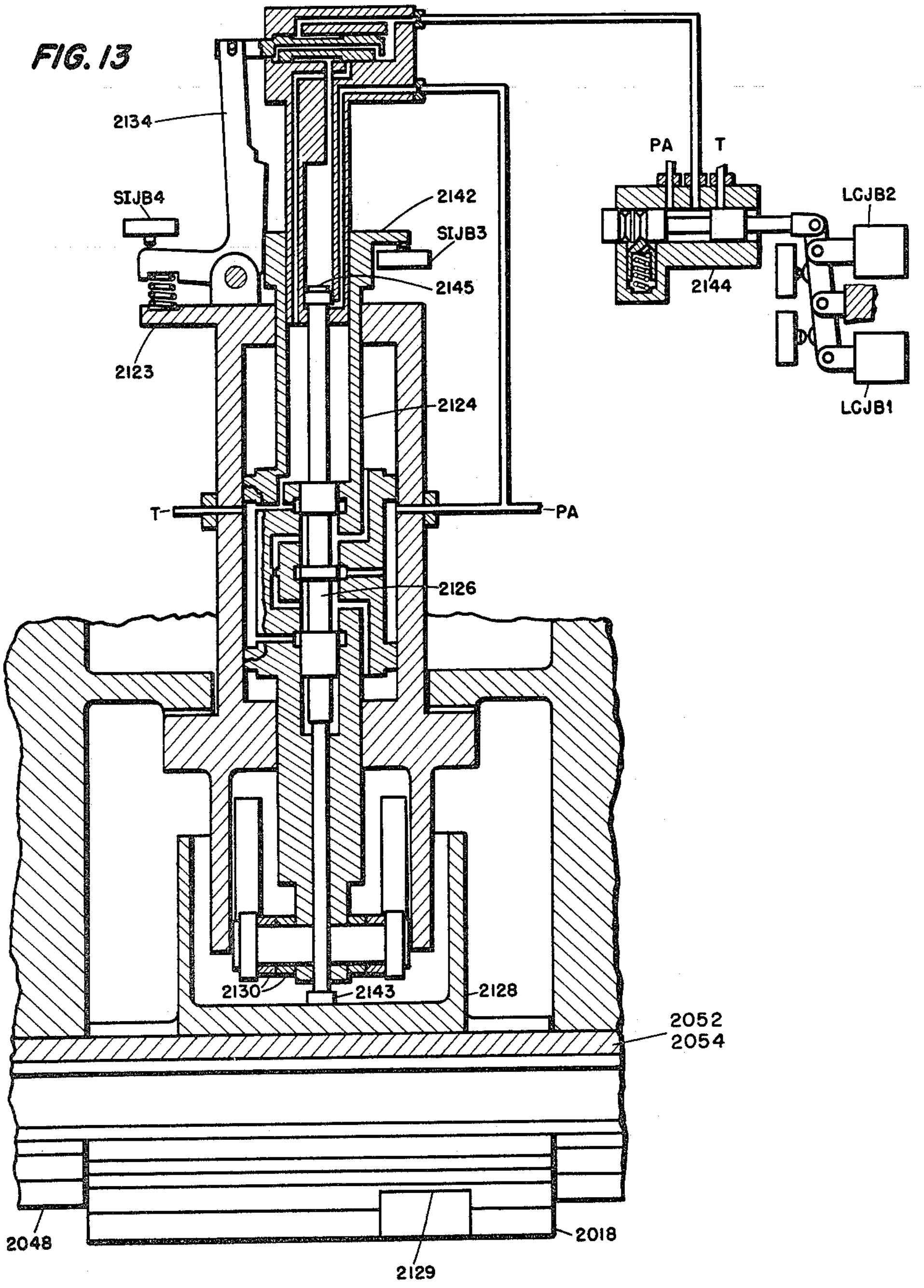
FIG. 13 is a schematic view, partly in cross section, of the floating track in lowered position.

In the floating or load position, illustrated in the split views of FIGS. 9 and 10, the hanger bars 2131 and a pair of hanger blocks 2132 support the weight on hanger cams 2133. The hanger blocks 2132 are retained in this position by the toggle links 2130 which are lifted slightly beyond center at a servo lift piston pin 2137 connected to the servo lift piston 2124. When the loader assembly power is off, the servo lift piston 2124 is locked in this position by a latch 2134 in the latch frame 2123, as shown in FIG. 13.

In the load position and prior to booster shoe contact, the hanger frame 2128 is held in a centered position by a pair of spring-loaded centering plungers 2135, shown best in FIGS. 4, 5, and 6, which contact the inner side of the chain tracks 2052 and 2054. In addition to the gravity load of the hanger frame 2128, there is a hydraulic force of 600 pounds acting on the frame. This weight must be overcome when the forward and aft booster shoes 202 and 204 make contact and lift the frame 2128.

Figure 14:
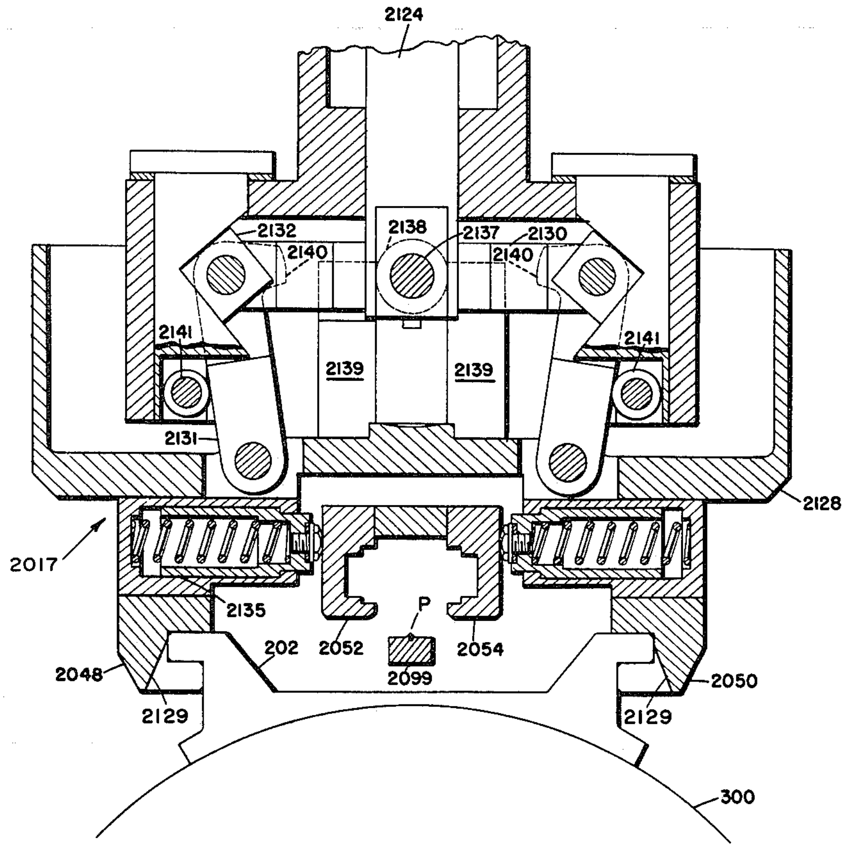
FIG. 14 is a schematic diagram, partly in cross section, of the forward floating track with the forward shoe being in an aligned position.
Figure 15:
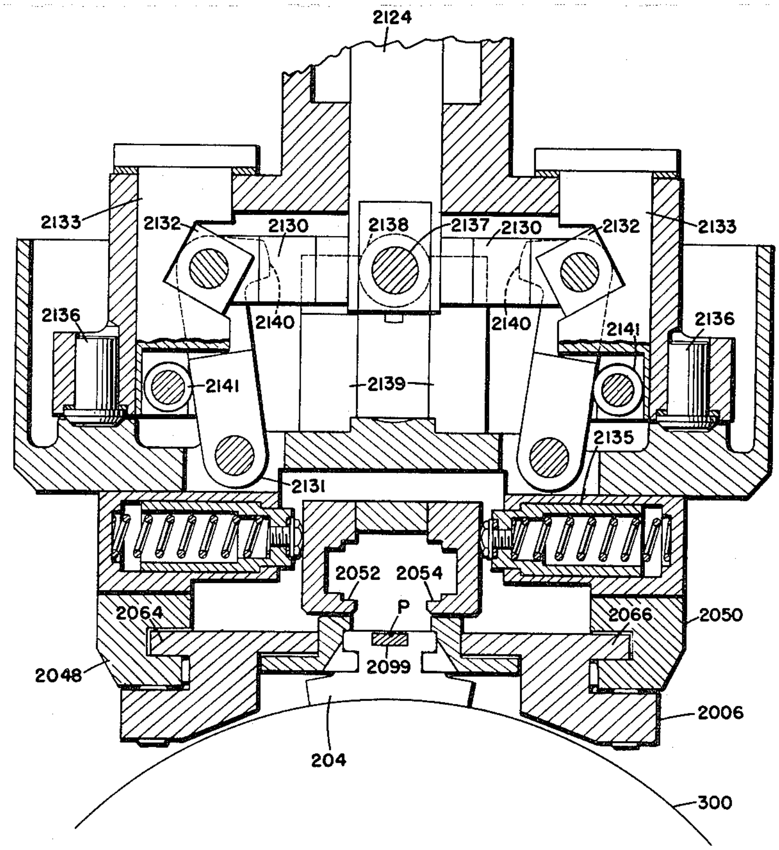
FIG. 15 is a schematic diagram, partly in cross section, of the aft floating track with the saddle cart being in an aligned position.

The forward and aft floating tracks 2017 and 2018 align independently of each other with their respective booster shoe. One floating track, say 2017 (2018), may align from the right of the centerline, while the other floating track, say 2018 (2017), may align from the left. FIG. 14 shows how the forward floating track 2017 is aligned to the forward booster shoe 202. The same principle applies, as illustrated in FIG. 15, to the alignment of the aft floating track 2018 with the aft booster shoe 204. In the latter figure will be noted the use of an intervening saddle cart 2006 which effectively increases the width of the narrow shoe 204.

The center of the top surface of the booster shoe 202 is located in a shaded tolerance rectangle 2099 of FIG. 14. The booster shoe 202 first contacts the tapered lead-in slot 2129 in the skid track and aligns the frame 2128 laterally with the shoe. Then, as the tray 502 with its missile-booster combination 300 is raised from the ready service mechanism 500, the frame 2128 is lifted by the forward booster shoe 202. The distance of lift of the missile-booster combination 300 depends on the stopping position of the hoists comprising the external lifting means of the ready service mechanism 500 and the various tolerances which exist in the hoisting tray 502 and structure of the missile-booster combination 300.

Variations in the position of the forward and aft booster shoes 202 and 204 can be expected between successive load cycles in a plane at right angles to the loader trunk 2003. In the vertical plane, the missile-booster combination 300 is raised to a nominal position below the loader skid tracks 2048 and 2050. The engaging surfaces of the aft booster shoe 204 of the missile-booster combination 300 will be one quarter of an inch below this position. However, the vertical lift of the aft booster shoe 204 will vary as much as plus or minus one quarter of an inch.

Inasmuch as each hoisting tray 502 is supported by the ends only, a certain amount of sag can be expected therein. As a result, the lift of the forward booster shoe 202 of the missile-booster combination 300 will be approximately one half an inch below the normal load position, with a vertical tolerance of the forward booster shoe 202 of plus or minus one half an inch.

In the lateral or transverse direction, the booster shoes 202 and 204 can be misaligned as much as plus or minus three quarters of an inch. The forward booster shoe 202, with its wide base, can be tilted as much as plus or minus two degrees relative to the loader tracks 2048 and 2050 in the lateral plane. Any deviation cannot be corrected by wedging the missile-booster combination 300 into alignment with tapered receptacles.

Figure 16:
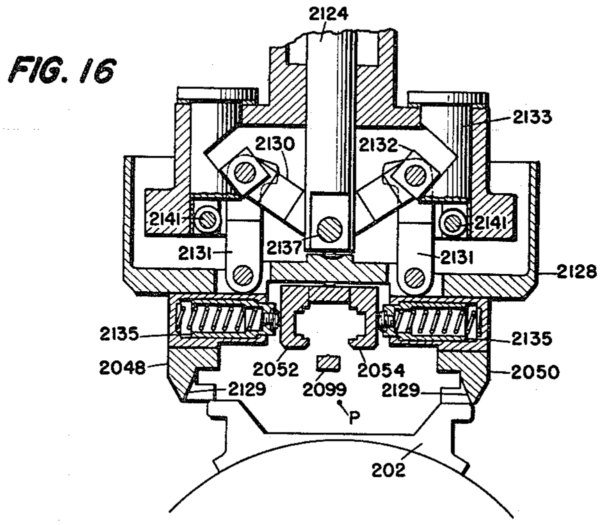
FIG. 16 is a vertical section, partly in elevation, illustrating the first stage of the floating track engagement with the forward booster shoe of the missile-booster combination.
Figure 17:
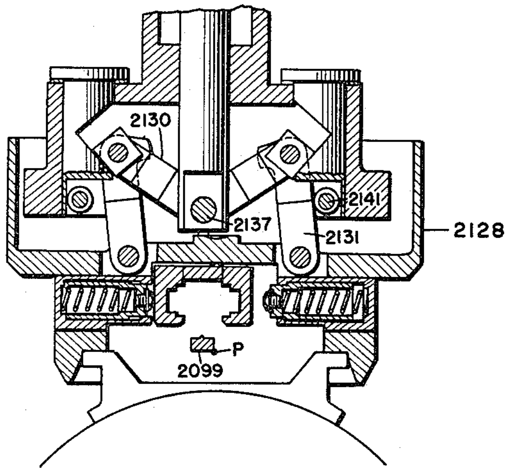
FIG. 17 is a vertical section, partly in elevation, illustrating the second stage of the floating track engagement with the forward booster shoe of the missile-booster combination.
Figure 18:
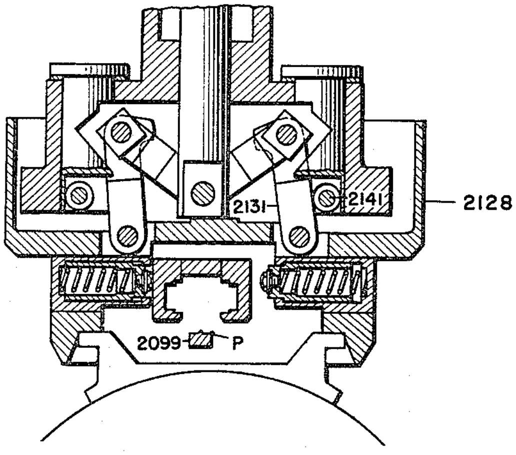
FIG. 18 is a vertical section, partly in elevation, illustrating the third stage of the floating track engagement with the forward booster shoe of the missile-booster combination.

As an illustration, a point P, above the top surface and at the center of the forward and aft booster shoes 202 and 204, respectively, is selected. The shaded rectangular areas shown in FIGS. 16, 17, and 18 represent the tolerance in position that can accommodate this point P. If the imaginary center P of the booster shoe 202 falls within these areas, the missile-booster combination 300 can be engaged, aligned, and raised to the loader rail.

The height of the tolerance rectangles 2099 are seven-eighths (⅞) inch and seven-sixteenths (7/16) inch, respectively, for the forward and aft booster shoes 202 and 204. At the peaked center of the tolerance rectangle 2099 for the aft track 2018 only the area reaches the total height of one half (½) inch. This is due to the beveled ends of hanger frame locators 2136 used on the aft track 2018 only, as shown in FIG. 15, which act as dowels to locate the frame 2128 in the final aligned position. The aft and forward floating tracks 2018 and 2017 can thus accommodate any reasonably misaligned position of the booster shoes 204 and 202.

The servo lift piston pin 2137, connected to the toggle links 2130, includes a pair of piston guide rollers 2138, as shown best in FIGS. 4, 14, and 15. These rollers 2138, guided by a piston guide cam 2139, prevent transverse loads on the extended servo piston 2124, as illustrated in FIGS. 5 and 6. The piston guide cams 2139, in addition, serve an added function. Under certain conditions, the top end of the hanger bars 2131 have a hanger bar protrusion 2140 which contacts the exterior side of the piston guide cams 2139.

As stated previously, the hanger frame 2138 will accommodate angular misalignment of the booster shoes 202 or 204 of as much as two degrees from the transverse horizontal. This angular misalignment is limited when the hanger bar protrusion 2140 and the piston guide cam 2139 make contact. Because of this, the hanger frame 2128 cannot further shift sideways when contacted by a misaligned shoe 202 or 204.

As shown best in FIGS. 14, 15, 16, 17, and 18, a pair of wedge rollers 2141 are used to align the missile-booster combination 300 and hanger frame 2128 to the loader skid tracks 2048 and 2050. As the servo piston 2124 lifts, as shown in FIGS. 17 and 18, to straighten the toggle links 2130, the hanger bar 2131 contacts one of the wedge rollers 2141. As the force of the piston 2124 pivots about the rollers 2141, the bar 2131 laterally forces the hanger frame 2128 into the correct alignment, as depicted in FIG. 14. The frame locators 2136 provided on the aft floating track only and illustrated in FIG. 15, maintain this aligned condition and withstand lateral load, such as the rolling of a vessel in shipboard applications.

As FIG. 13 shows, the hanger frame 2128 has been lowered to rest on the chain tracks 2052, 2054 (a total of one and one-eighth of an inch in this position of the forward section). The aft floating track 2018 has been lowered five-eighths of an inch. This is one-eighth of an inch more than previously mentioned. However, it is necessary for switch indication, as will be explained subsequently.

FIG. 13 also shows a projection 2142 at the top end of the servo piston 2124 contacting an interlock switch SIJB3. When the switch SIJB3 is closed, it signals that the aft floating track 2018 has been lowered. When the missile-booster combination 300 is hoisted to the loader trunk 2003, the aft floating track 2018 must be lifted at least this one-eighth of an inch to get an indication that the booster shoes 202 and 204 are in contact with the tracks.

A probe 2143, shown in FIGS. 11 and 13 and in detail in FIGS. 7 and 8, contacts the hanger frame 2128 with a hydraulic force of about 600 pounds. When the hanger frame 2128 is lifted by the missile-booster combination 300, it must lift against this force in addition to the weight of the hanger frame 2128 itself. When the probe 2143 is lifted by contact with the hanger frame 2128, the servo lift piston 2124 also lifts. The servo lift piston 2124 always follows the movement of the servo valve 2126.

Once the missile-booster combination 300 has been rammed the four inches to engage the loader skid tracks 2048 and 2050 of the floating tracks 2017 and 2018, a solenoid LCJB2 is energized. This solenoid shifts a control valve 2144 and ports hydraulic pressure from the top side of a pilot piston 2145, shown in FIGS. 6 and 13, to a header tank T. Since the bottom side of the piston 2145 is always connected to the fluid pressure PA, the servo piston 2124 and servo valve 2126 are raised. The toggle links 2130 and hanger bars 2131 align and lift the missile-booster combination 300 to the loader skid tracks 2048 and 2050. An interlock switch SIJB4 indicates when the piston 2124 is lifted and latched.

Figure 19:
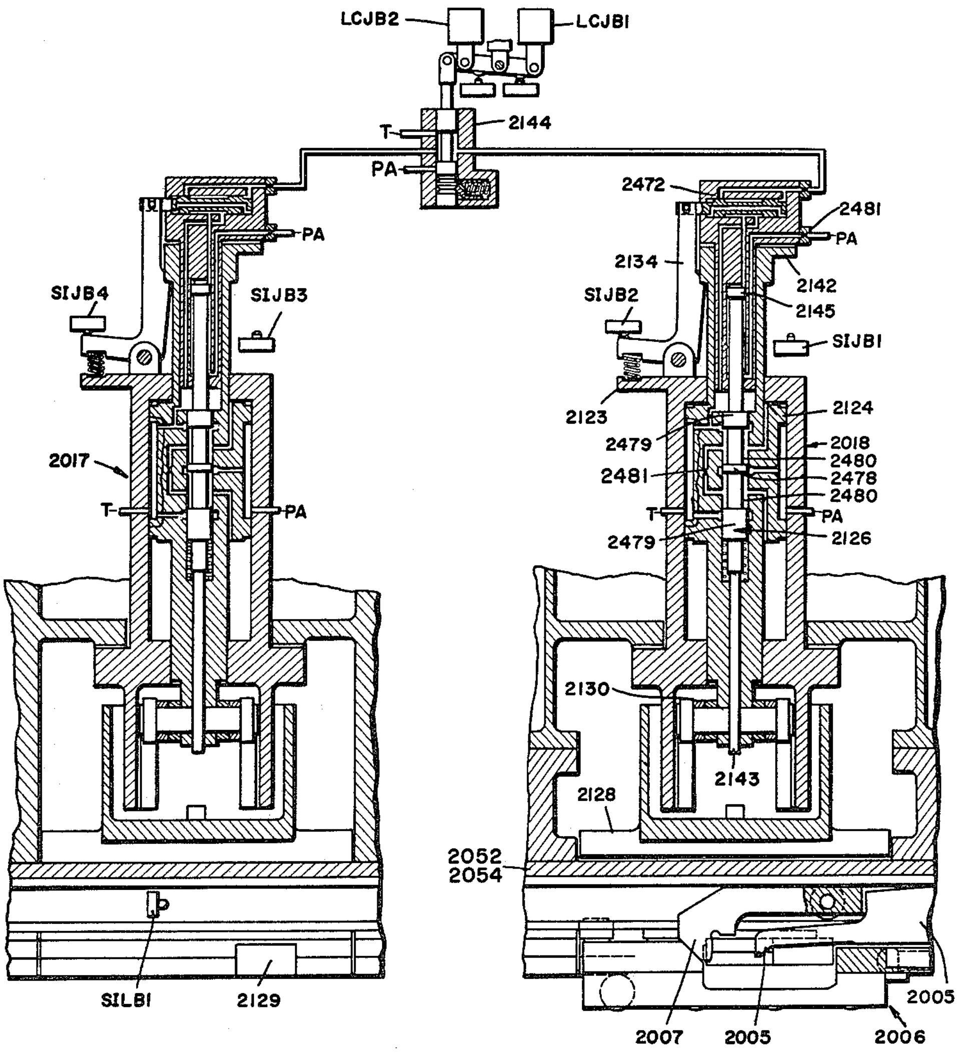
FIG. 19 is a schematic, partly in cross section and side elevation, of the forward and aft floating tracks.

The forward floating track 2017 includes a rail loaded switch SILB1, as shown in FIGS. 6, 10, and 19. This switch SILB1 is actuated by the forward booster shoe 202 after the missile-booster combination 300 has been rammed by the rammer 2020.

As shown in FIGS. 4 and 5, each end of skid tracks 2048 and 2050 of the floating tracks 2017 and 2018 has a guide plate 2146 to contact the adjacent fixed skid tracks 2048 and 2050 on the loader trunk 2003. These guide plates 2146 tolerate all longitudinal thrust loads of the missile-booster combinations 300 and longitudinally locate the forward and aft floating tracks 2017 and 2018 during alignment of the missile-booster combination 300.

Aside from the common solenoid-controlled selector valve 2144, each forward and aft floating track 2017 and 2018, respectively, is provided with a latch release valve 2472, the floating track pilot piston 2145, the floating track servo valve 2126, the floating track servo lift piston 2124, and the probe 2143, as shown best in FIG. 6. The floating track pilot piston 2145, the floating track servo valve 2126 and probe 2143 are assembled as one unit which serves three different functions.

As shown in FIG. 6, in the stowed position, the floating track servo piston 2124 is held in position by the latch 2134. An internal spring 2474 supports the floating track servo valve 2126 and floating track pilot piston 2145. A portion of the latch release valve block 2122 extends below the block and forms a cylinder 2476 for the floating track pilot piston 2145. In tracing the hydraulic circuit of FIG. 19, it will be noted that accumulator pressure fluid PA is ported to a center land 2478 of the three-land floating track servo valve 2126. A pair of valve chambers 2480 provided on each side of the center land 2478 are arranged to be ported to the top and bottom sides of the floating track servo lift piston 2124. Two end lands 2479 control the fluid outlet connection to the header tank T.

In the power-off conditions of FIG. 19, with solenoid LCJB2 retracted, the floating track servo valve 2126 is slightly off neutral with respect to the valve ports. This amounts to an opening of the valve lands of about 0.031 inch. As a result, the bottom side of the floating track servo lift piston 2124 is open to the pressure line and the top side of the piston 2124 is ported to the header tank T as shown. This slight opening prevents a possible mechanical lock when the accumulator pressure fluid is open to the floating track servo lift piston 2124.

When the power is turned on, the pressure fluid is ported to the bottom side of the floating track servo lift piston 2124. The floating track servo lift piston 2124 is lifted until the floating track servo valve 2126 is in a neutral position. As the floating track servo lift piston 2124 raises, the load is removed from the latch 2134. When the power is turned on and the floating track servo lift piston 2124 is lowered, the full hydraulic load of the piston 2124 will be contained by the latch 2134.

When solenoid LCJB1 is energized, pressure fluid is ported to the rear of the latch release valve 2472. This latch release valve 2472 moves to release the latch 2134. The pressure fluid is then ported to the top side of the floating track pilot piston 2145. It is to be noted that the bottom side of this floating track pilot piston 2145 is also connected to the accumulator pressure fluid source (PA) through a different line, as shown in FIG. 19.

Because of the area difference between the top and bottom of its floating track pilot piston 2145, the piston 2145 moves down at a rate controlled by an orifice 2481. The floating track pilot piston 2145 breaks the connection of the toggle link 2130 and the hanger frame 2128 is lowered until it rests on the chain tracks 2052 and 2054. The floating track pilot piston 2145 and the floating track servo valve 2126 continue to move until the probe 2143 contacts the hanger frame 2128. During the downward extension of the aft floating track 2018, the aft and forward motion pawls 2005 and 2007 of the saddle cart 2006 remain at track level held within the chain tracks 2052, 2054, while the skids 2064 and 2066 of the cart hinge downward within the floating sections of the skid tracks 2048 and 2050, as shown in FIG. 9.

Obviously, many modifications and variations of the present invention are possible in light of the above teachings. It is, therefore, to be understood that within the scope of the appended claims, the invention may be practiced otherwise than as specifically described.

What is claimed is:

1. A conveyor system having converging means longitudinally spaced apart, a loader trunk extending longitudinally between and beyond said converging means, said trunk supporting longitudinally extending laterally separated tracks, each of said converging means having floating tracks laterally spaced apart, said floating tracks having the same lateral spacing as said separated tracks of said trunk, said converging means having means for extending outwardly said floating tracks, said pair of floating tracks being laterally displaceable to align with longitudinally spaced elements of an object spaced from said trunk, said converging means having means for lifting and aligning said floating tracks with said separated tracks of said trunk.

2. A conveyor system having a loader trunk, longitudinally extending laterally spaced rails supported by said trunk, said trunk supporting pairs of longitudinally extending laterally spaced tracks straddling said spaced rails, each of said pairs being longitudinally separated, converging means longitudinally spaced apart and located between said longitudinally separated pairs of said tracks, each of said converging means having floating tracks laterally spaced apart and straddling said spaced rails, said floating tracks having the same lateral spacing as said trunk supported laterally spaced tracks, said converging means having means for extending outwardly said floating tracks, said pair of floating tracks being laterally displaceable to align with longitudinally spaced elements of an object vertically spaced from said trunk, said converging means having means for lifting and aligning said floating tracks with said longitudinally separated pairs of said laterally spaced tracks.

3. In the conveyor system as recited in claim 2 wherein said converging means include a toggle arrangement and a plurality of spaced cam elements for laterally aligning said pair of floating tracks with said longitudinally spaced elements and hanger bars and rollers for forcing the floating tracks into alignment with said laterally spaced tracks.

4. In the conveyor system as recited in claim 2, and said converging means having spring means acting against said laterally spaced rails for centering said floating tracks.

References Cited in the file of this patent

UNITED STATES PATENTS

| | | |
|---|---|---|
| 646,369 | Krane | Mar. 27, 1900 |
| 1,148,585 | Haddock | Aug. 3, 1915 |
| 1,570,035 | Bennington | Jan. 19, 1926 |
| 2,035,355 | Weise | Mar. 24, 1936 |
| 2,826,960 | Schiavi | Mar. 18, 1959 |
| 2,870,678 | Girouard et al. | Jan. 27, 1959 |
| 2,978,959 | Carlberg | Apr. 11, 1961 |
| 2,985,072 | Carlberg et al. | May 23, 1961 |